United States Patent
Washino (10) Patent No.: US 11,512,206 B2
(45) Date of Patent: Nov. 29, 2022

(54) SEALANT FOR SCREWING MEMBERS

(71) Applicant: Threebond Co., Ltd., Tokyo (JP)

(72) Inventor: Erika Washino, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 403 days.

(21) Appl. No.: 16/764,610

(22) PCT Filed: Dec. 4, 2018

(86) PCT No.: PCT/JP2018/044608
§ 371 (c)(1),
(2) Date: May 15, 2020

(87) PCT Pub. No.: WO2019/111908
PCT Pub. Date: Jun. 13, 2019

(65) Prior Publication Data
US 2020/0392348 A1 Dec. 17, 2020

(30) Foreign Application Priority Data
Dec. 6, 2017 (JP) .............................. JP2017-234206

(51) Int. Cl.
*C09D 5/02* (2006.01)
*C09D 125/14* (2006.01)
*F16B 33/00* (2006.01)
*C08K 7/02* (2006.01)
*C08L 77/06* (2006.01)
*C09D 133/08* (2006.01)
*C09D 133/10* (2006.01)

(52) U.S. Cl.
CPC ............ *C09D 5/024* (2013.01); *C09D 125/14* (2013.01); *F16B 33/004* (2013.01); *C08K 7/02* (2013.01); *C08L 77/06* (2013.01); *C08L 2203/12* (2013.01); *C09D 133/08* (2013.01); *C09D 133/10* (2013.01)

(58) Field of Classification Search
CPC ........ C09D 5/024; C09D 125/14; C08K 7/02; F16B 33/004
USPC ....................................................... 526/329.2
See application file for complete search history.

(56) References Cited

U.S. PATENT DOCUMENTS

| 2011/0213069 A1 | 9/2011 | Kanazawa et al. |
| 2015/0133591 A1* | 5/2015 | Aita ........................ C09J 133/08 524/533 |

FOREIGN PATENT DOCUMENTS

| JP | H10-120311 A | 5/1998 |
| JP | H10-288214 A | 10/1998 |
| JP | 2008-069869 A | 3/2008 |
| JP | 2009-052734 A | 3/2009 |
| JP | 2010-106222 A | 5/2010 |
| JP | 2015-524006 A | 8/2015 |
| JP | 2017-110100 A | 6/2017 |

OTHER PUBLICATIONS

EPO, Extended European Search Report for the corresponding European patent application No. 18885123.2, dated Oct. 2021.
PCT, International Search Report for the corresponding patent application No. PCT/JP2018/044608, dated Mar. 5, 2019, with English translation.
PCT, Written Opinion of the International Searching Authority for the corresponding patent application No. PCT/JP2018/044608, dated Mar. 5, 2019.

* cited by examiner

*Primary Examiner* — Hui H Chin
(74) *Attorney, Agent, or Firm* — Lucas & Mercanti, LLP (57) ABSTRACT

A sealant for screwing members contains: (a) a self-cross-linking aqueous emulsion; (b) a nanofiberized aramid fiber substance; and (c) a film-forming aid containing a mixture. The mixture contains a compound represented by formula 1: $CH_3O—(CH_2CH_2O)_n—H$. In formula 1, n is 4 or more. An equilibrium reflux boiling point of the overall mixture is 280° C. or higher.

8 Claims, 1 Drawing Sheet

SEALANT FOR SCREWING MEMBERS

CROSS REFERENCE TO RELATED APPLICATION

This Application is a 371 of PCT/JP2018/044608 filed on Dec. 4, 2018 which, in turn, claimed the priority of Japanese Patent Application No. 2017-234206 filed on Dec. 6, 2017, both applications are incorporated herein by reference.

TECHNICAL FIELD

The present invention relates to a sealant for screwing members, a screwing member, and a method for manufacturing the same.

BACKGROUND ART

Heretofore, a seal tape has been used as a sealant for tight adhesion of a screwed portion such as a pipe joint. The purpose of using the seal tape for the screwed portion is to prevent the leakage of a liquid or gas or the like by filling gaps occurring in a connected portion of pipes, or the like. The seal tape contains a fluorine resin as a main material. The seal tape is likely to tightly adhere to the screwed portion because of its softness, and the fluorine resin is flexibly deformed when the seal tape is tightened into equipment, to allow a clearance with the equipment to be filled with the fluorine resin. Therefore, the seal tape has been used as the sealant. In a method for covering the screwing member with the seal tape, the seal tape has been wound around the screwing member by using a winding device or manually. In such a seal tape winding device, for example, a device disclosed in Patent Literature 1, a screwing member and a seal tape are set in the device to cover the screwing member with the seal tape according to the switching of ON/OFF of a switch. However, only one screwing member can be covered by the single switching of ON/OFF of the switch for each device, and works of attaching the screwing members must be continuously performed, to result in poor work efficiency. This has a problem in terms of productivity.

Then, in order to solve this problem, a sealant containing a liquid resin composition has been developed. The liquid resin composition makes it unnecessary to process the screwing members one by one. For example, the plurality of screwing members are aligned on one surface of a screwing member fixing panel, and subjected to one dipping operation. This makes it possible to process the plurality of screwing members. The composition is liquid, whereby the degree of freedom of the application range of the composition is higher than that of the seal tape. Therefore, automatic application of the composition to various sizes can be provided by a dedicated machine.

A sealant containing a liquid resin composition (a sealant containing a liquid resin composition using a dispersion medium (water)) requires a drying step of volatilizing the dispersion medium (water) after applying the sealant to a screwing member. The drying step is generally performed by drying due to hot air in a drying furnace or the like in consideration of mass productivity.

CITATION LIST

Patent Literature

Patent Literature 1: JP 10-120311 A

SUMMARY OF INVENTION

Technical Problem

However, if the sealant containing the liquid resin composition is applied to the screwing member and then dried with hot air in a state where the dispersion medium (water) is not volatilized, a coating film is biased, which has a problem that the sealant cannot be commercialized because of poor quality. Examples of the poor quality include the following case. When the sealant containing the liquid resin composition is applied to the screwing member, and volatile components are dried, the coating film is biased, so that the coating film becomes non-uniform when the screwing member (for example, the screwed portion) is overlooked. That is, typical examples thereof include a poor appearance. In some cases, this poor appearance may cause deterioration in sealing properties.

In view of the above, an object of the present invention is to solve such a problem of the related art, and to provide a technique which prevents a coating film from being biased even when the coating film is dried by hot air in a state where water as a dispersion medium is not volatilized after a sealant containing a liquid resin composition is applied to a screwing member.

Solution to Problem

A sealant for screwing members reflecting an aspect of the present invention for achieving at least one of the objects has the following configuration.

A sealant for screwing members contains: (a) a self-cross-linking aqueous emulsion; (b) a nanofiberized aramid fiber substance; and (c) a film-forming aid containing a mixture, wherein the mixture contains a compound represented by the following formula 1:

[Chemical Formula 1]

$$CH_3O-(CH_2CH_2O)_n-H \quad \text{(Formula 1)}$$

n is 4 or more, and an equilibrium reflux boiling point of the overall mixture is 280° C. or higher.

Advantageous Effects of Invention

Even when a sealant containing a liquid resin composition is applied to a screwing member, and a coating film is then dried by hot air in a state where water as a dispersion medium is not volatilized, the coating film can be prevented from being biased.

DESCRIPTION OF EMBODIMENTS

The present invention is a sealant for screwing members containing: (a) a self-cross-linking aqueous emulsion; (b) a nanofiberized aramid fiber substance (which can also simply be defined by the term "aramid fiber"); and (c) a film-forming aid containing a mixture, wherein the mixture contains a compound represented by the following formula 1:

[Chemical Formula 2]

$$CH_3O-(CH_2CH_2O)_n-H \quad \text{(Formula 1)}$$

n is 4 or more, and an equilibrium reflux boiling point of the overall mixture is 280° C. or higher. Such a configuration can prevent a coating film from being biased even when a sealant containing a liquid resin composition is applied to a screwing member, and then dried with hot air in a state where water as a dispersion medium is not volatilized.

In short, the present invention provides a technique in which the self-cross-linking aqueous emulsion, the nanofiberized aramid fiber substance, and the film-forming aid are contained in the sealant for screwing members to prevent the coating film from being biased during hot air drying. According to a preferred embodiment of the present invention, the sealant for screwing members can prevent the coating film from being biased, whereby a so-called pre-coated bolt having an excellent appearance can be provided.

The present invention will be described in detail below.

<Component (a)>

The sealant for screwing members of the present invention contains a self-cross-linking aqueous emulsion.

The component (a) used in the present invention is not particularly limited as long as it is the self-cross-linking aqueous emulsion. The aqueous emulsion refers to an emulsion obtained by adding a surfactant and a polymerization initiator to a polymerizable monomer, followed by performing emulsion polymerization, so that produced polymer particles are stably dispersed in water. When water is volatilized in a drying process, the polymer particles gather and fuse together. More specifically, in the self-cross-linking aqueous emulsion, water-insoluble droplet-like polymers are subjected to a crosslinking reaction in the drying process when the polymers fuse together. Here, in the present specification, in the condition of a drying step (or sometimes simply referred to as "drying"), a temperature is preferably 20 to 150° C., more preferably 40 to 120° C., still more preferably 50 to 110° C., yet still more preferably 60 to 100° C., and further preferably 70 to 95° C. A time is preferably 10 to 300 minutes, more preferably 15 to 100 minutes, still more preferably 20 to 50 minutes, and yet still more preferably 25 to 40 minutes.

The self-cross-linking mechanism of the aqueous emulsion can be assumed as follows. For example, a polymer having a functional group (for example, a pendant functional group) and a cross-linking agent substance having two or more functional groups are added into water. When water is evaporated during a drying process, the functional group of the polymer and the functional group of the cross-linking agent react with each other to form self-cross-linking. For example, a polymer having a carbonyl group as a pendant functional group and a component serving as a cross-linking agent having two or more functional groups (for example, polyhydrazide) react with each other to form self-cross-linking. In addition, for example, a polymer having a functional group (for example, a pendant functional group) is added into water. However, the water does not contain a substance serving as a cross-linking agent. When water is evaporated during a drying process, a functional group pendant on one polymer and a functional group pendant on another polymer react with each other to form self-cross-linking. Alternatively, when water is volatilized in the drying process, the functional group pendant on the polymer and at least one of reactive groups (for example, hydroxyl groups) which may be present on the surface of the screwing member to which the sealant for screwing members is applied (joining surface) react with each other to form self-cross-linking. More specific examples thereof include a reaction between polymers pendant with a silane having a hydrolyzable group, a reaction between a polymer pendant with a silane having a hydrolyzable group and a hydroxyl group on a joining surface, and the like. Examples of the self-cross-linking aqueous emulsion include, but are not limited to, these types.

In an embodiment of the present invention, the self-cross-linking aqueous emulsion may contain a homopolymer of an aliphatic vinyl monomer or aromatic vinyl monomer, or may be a copolymer containing at least one of an aliphatic vinyl monomer and an aromatic vinyl monomer. Examples of the aliphatic vinyl monomer include an aliphatic vinyl monomer having a carboxyl group such as acrylic acid or its ester, methacrylic acid or its ester, itaconic acid or its ester, maleic acid or its ester, or fumaric acid or its ester. Here, the ester is not limited, but, for example, an ester of methyl, ethyl, butyl, or 2-ethylhexyl is suitable. As the aromatic vinyl monomer, styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, and dimethylaminoethylstyrene and the like can be used.

In the embodiment of the present invention, a self-cross-linking aqueous emulsion containing at least one of a (meth)acrylic acid ester copolymer and a (meth)acrylic acid ester homopolymer; and a self-cross-linking aqueous emulsion containing a styrene-(meth)acrylic acid ester copolymer, and the like are suitable. Therefore, according to the embodiment of the present invention, the component (a) is a styrene-(meth)acrylic acid ester copolymer emulsion.

These may be used alone or in mixture of two or more.

Examples of a commercially available product of the self-cross-linking aqueous emulsion containing at least one of a (meth)acrylic acid ester copolymer and a (meth)acrylic acid ester homopolymer include UW-600 and UW-550CS (Taisei Fine Chemical Co., Ltd.), Aron NW-400 and Aron A-3611A (Toagosei Co., Ltd.), and NeocrylXK-12 and NeocrylXK-16 (Kusumoto Kasei Co., Ltd.) and the like. Examples of a commercially available product of the self-cross-linking aqueous emulsion containing a styrene-(meth) acrylic acid ester copolymer include Aron NW-7060 (Toagosei Co., Ltd.) and ACRONAL YS-800ap (BASF Japan Ltd.) and the like.

In the embodiment of the present invention, the solid content concentration of the self-cross-linking aqueous emulsion as a raw material for producing (preparing) the sealant for screwing members of the present invention in an aqueous dispersion is preferably 20 to 60% by mass, more preferably 30 to 55% by mass, and still more preferably 40 to 50% by mass.

In the embodiment of the present invention, the content (solid content) of the self-cross-linking aqueous emulsion in the sealant for screwing member is preferably 9 to 24 parts by mass, more preferably 11 to 22 parts by mass, and still more preferably 13 to 19 parts by mass when the amount of the sealant for screwing members excluding water as a dispersion medium (containing water contained in an aqueous dispersion of an aqueous emulsion as a raw material) is 84 to 86 parts by mass. In the present specification, when two or more components are used, the content thereof means the total amount.

<Component (b)>

The sealant for screwing members of the present invention contains a nanofiberized aramid fiber substance. The addition of the nanofiberized aramid fiber substance to the sealant for screwing members makes it possible to prevent the coating film from being biased in the drying step of volatile components. The cause of the bias of the coating film when the nanofiberized aramid fiber substance is not added is considered as follows. A sealant-forming is being continued from a portion as a core where the emulsion, which is applied to the screwing member, first starts to become a film so that the resin is wholly pulled to the core portion. In contrast, it is presumed that the nanofiberized aramid fiber substance is contained (suitably, by uniformly dispersing the nanofiberized aramid fiber substance in the resin (sealant)), whereby the resin (sealant) can be prevented from being pulled to a part of the core portion. Such presumption does not limit the technical scope of the present invention.

The component (b) used in the present invention is not particularly limited as long as it is the nanofiberized aramid fiber substance. The term "nanofiberized" refers to a formation of a fiber by which the fiber has a fiber diameter of 1 to 1,000 nm and a length of, for example, 100 times or more of the fiber diameter. In the embodiment of the present invention, the average fiber diameter of single fibers composed of the aramid fiber substance is preferably 60 nm or more and less than 1000 nm, more preferably 60 to 950 nm, still more preferably 100 to 500 nm, yet still more preferably 150 to 400 nm, and further preferably 180 to 350 nm. Here, for example, a number average fiber diameter can be determined by measuring the fiber diameter from a secondary electron image obtained by a scanning electron microscope, but the method for measuring the fiber diameter is not limited thereto. More specifically, using a photograph taken at a magnification of 30 to 1000 times with a scanning electron microscope, the diameters of the fibers at randomly selected 10 locations (the number is not limited to 10 as long as it is statistically reliable value) can be actually measured to calculate the average value. Meanwhile, the method for measuring the fiber length is, for example, a laser analysis method using a fiber length measuring device. By obtaining a fiber length distribution, a number average fiber length, a length weighted average fiber length, and a length-length weighted average fiber length can be calculated. The length weighted average fiber length is set when all the fibers can be assumed to have the same roughness degree, and the length-length weighted average fiber length is set based on the assumption that the roughness degree of the fiber is proportional to the length. When these assumptions are set, calculation using the length weighted average fiber length or the length-length weighted average fiber length is more accurate than calculation using the number average fiber length (weighting the denominator number). In the case of the nanofiberized aramid fiber substance, the roughness degree of the fiber can be assumed to be proportional to the length from the viewpoint of the manufacturing method thereof, whereby the length-length weighted average fiber length value can be used. However, the present invention is not limited thereto.

In the embodiment of the present invention, the length-length weighted average fiber length of the nanofiberized aramid fiber substance is preferably 100 to 900 μm, more preferably 300 to 800 μm, and still more preferably 400 to 700 μm.

In the embodiment of the present invention, the aspect ratio of a single fiber of the nanofiberized aramid fiber substance is preferably 1,000 to 3,500, more preferably 1,000 to 3,000, and still more preferably 1,200 to 3,000, and may be 1,500 to 2,500. The aspect ratio is represented by a ratio of the vertical length (fiber length) of the aramid fiber substance to the horizontal length (fiber diameter) thereof. In the calculation method, the aspect ratio can be obtained by dividing the average value of the vertical lengths by the average value of the horizontal lengths.

Examples of the method for manufacturing the nanofiberized aramid fiber substance include a method for applying cavitation energy to a fiber assembly to nanofiberize the fiber assembly, as shown in JP 2010-222717 A. However, the present invention is not particularly limited to the manufacturing method.

Here, the aramid fiber substance is a polyamide substance composed of only an aromatic skeleton, and examples thereof include meta-aramid and para-aramid. However, in the present invention, the aramid fiber substance is not limited to any of the aramids as long as the aramids are nanofiberized. In a preferred embodiment of the present invention, suitable examples of the nanofiberized fibers include para-aramid fibers (polyparaphenylene terephthalamide fibers ("Kevlar (registered trademark)" manufactured by Du Pont-Toray Co., Ltd. and "Twaron" manufactured by Teijin Aramid B. V.); copoly(p-phenylene)-3,4-diphenyl ether terephthalamide fibers ("Technora (registered trademark)" manufactured by Teijin Techno Products Limited) and the like); meta-aramid fibers (polymetaphenylene isophthalamide fibers (trade name "Nomex" manufactured by DuPont, and "Cornex" manufactured by Teijin Techno Products Limited)). When the fiber assembly is produced using these fibers, the fiber assembly can be produced using the fibers alone or in combination of two or more thereof.

Examples of a commercially available product of the nanofiberized aramid fiber substance include Tiara KY-400S (manufactured by Du Pont-Toray Co., Ltd.). However, the commercially available product is not particularly limited as long as it is obtained by nanofiberizing aramid as a raw material.

In the embodiment of the present invention, the solid content concentration of the aqueous dispersion of the nanofiberized aramid fiber substance as a raw material for producing (preparing) the sealant for screwing members of the present invention is preferably 5 to 40% by mass, more preferably 10 to 35% by mass, and still more preferably 15 to 25% by mass.

In the embodiment of the present invention, the content (solid content) of the nanofiberized aramid fiber substance in the sealant for screwing members is preferably 0.01 to 1.0 part by mass, and more preferably 0.02 to 0.8 parts by mass when the amount of the sealant for screwing members excluding water as a dispersion medium (containing water contained in the dispersion liquid of the nanofiberized aramid fiber substance as a raw material) is 84 to 86 parts by mass.

In the embodiment of the present invention, the addition amount of the solid content of the component (b) based on 100 parts by mass of the solid content of the component (a) is preferably 0.1 to 3.0 parts by mass, more preferably 0.15 to 2.5 parts by mass, and still more preferably 0.2 to 2.5 parts by mass. When the addition amount of the solid content of the component (b) based on the solid content of the component (a) is less than 0.1 parts by mass, the addition amount is not sufficient to prevent the coating film from being biased, so that the coating film may be biased. Meanwhile, when the addition amount of the solid content of the component (b) based on the solid content of the component (a) is more than 3.0 parts by mass, the viscosity of the sealant becomes excessively high. When the sealant is applied to the screwing member using, for example, an automatic application device, workability may be deteriorated. For example, a uniform coating film cannot be formed. In order to solve the deterioration in workability, means for diluting a sealant with a dispersion medium (water) to lower the viscosity of the sealant is also present. However, when the sealant is excessively diluted, the rate of the solid content (non-volatile content) of the component (a) in the dispersion medium (water) is low, which may be apt to cause dripping to occur before the sealant is applied to the screwing member and dried. In the embodiment of the present invention, the addition amount of the solid content of the component (b) based on 100 parts by mass of the solid content of the component (a) is 0.33 parts by mass or more. Such an embodiment has a technical effect of preventing the coating film from being biased.

<Component (c)>

The sealant for screwing members of the present invention contains a film-forming aid containing a mixture, wherein the mixture contains a compound represented by the following formula 1:

[Chemical Formula 3]

$$CH_3O-(CH_2CH_2O)_n-H \quad \text{(Formula 1)}$$

wherein n is 4 or more, and an equilibrium reflux boiling point of the overall mixture is 280° C. or higher.

Here, in the formula 1, a substance in which n=1 is set, a substance in which n=2 is set, and a substance in which n=3 is set are respectively referred to as ethylene glycol monomethyl ether (boiling point: 124° C.), diethylene glycol monomethyl ether (boiling point: 194° C.), and triethylene glycol monomethyl ether (boiling point: 249° C.). When n is 2 or more, a compound represented by the formula 1 is generally referred to as polyethylene glycol monomethyl ether. n of the compound represented by the formula 1 and contained in the film-forming aid of the present invention is not particularly limited as long as n is 4 or more. n is preferably 15 or less, more preferably 11 or less, and still more preferably 8 or less.

Here, the term "reflux" refers to a state where a liquid is constantly boiled and condensed repeatedly, and is generally achieved by heating a flask containing a solution in a state where a condenser is connected to the flask. During refluxing, the reaction proceeds at a constant boiling point depending on a solvent. A temperature at that time is referred to as an equilibrium reflux boiling point (sometimes simply abbreviated as "reflux boiling point").

The sealant for screwing members of the present invention contains the film-forming aid containing a mixture, wherein the mixture contains a compound represented by the following formula 1:

[Chemical Formula 4]

$$CH_3O-(CH_2CH_2O)_n-H \quad \text{(Formula 1)}$$

n is 4 or more, and an equilibrium reflux boiling point of the overall mixture is 280° C. or higher. This provides the following effect. That is, even in an environment where the coating film is apt to be biased, such as a case where a hot air dryer is used to dry the volatile components in the drying step, the coating film can be prevented from being biased. The mechanism by which the operation is provided is assumed to be as follows. That is, by adding the film-forming aid (compound) having a boiling point significantly higher than that of the dispersion medium (water) to the sealant for screwing members, the dispersion medium (water) can be prevented from being rapidly volatilized by hot air. This is presumed to cause a film-forming contraction force occurring during emulsion fusion (during film-forming) to be reduced, as a result of which the coating film is prevented from being biased. The technical scope of the present invention is not limited by such presumption. Here, the hot air dryer refers to a device capable of causing air to constantly flow in the dryer under a set temperature environment. Here, if the equilibrium reflux boiling point of the overall mixture is lower than 280° C. even when a compound in which n in the formula 1 is 4 or more is contained, the coating film may be biased. In the embodiment of the present invention, by using the dryer capable of causing the air to constantly flow in the dryer, the temperature in the dryer can be kept constant, whereby even drying can be achieved, which can provide stable (even) adhesion.

In the embodiment of the present invention, the mixture preferably contains the compound in an amount of 50% by mass or more, more preferably 60% by mass or more, and still more preferably 65% by mass or more. Such an embodiment can prevent the coating film from be biased. The upper limit of the amount is not particularly limited, but it is 100% by mass or less, 99% by mass or less, or 98% by mass or less. Such an embodiment can prevent the coating film from be biased.

In the present invention, the equilibrium reflux boiling point of the overall mixture is 280° C. or higher. In the embodiment of the present invention, the equilibrium reflux boiling point of the overall mixture is preferably 282° C. or higher, the equilibrium reflux boiling point of the overall mixture is more preferably 285° C. or higher, and the equilibrium reflux boiling point of the overall mixture is still more preferably 287° C. or higher. Such an embodiment can more effectively prevent the coating film from be biased. The upper limit of the equilibrium reflux boiling point is not particularly limited, but it is preferably 330° C. or lower, more preferably 320° C. or lower, and still more preferably 310° C. or lower. Such an embodiment can maintain good storage stability.

Examples of a commercially available product of a film-forming aid containing a mixture, wherein the mixture contains a compound represented by the following formula 1:

[Chemical Formula 5]

$$CH_3O-(CH_2CH_2O)_n-H \quad \text{(Formula 1)}$$

n is 4 or more, and an equilibrium reflux boiling point of the overall mixture is 280° C. or higher, include, but are not limited to, MPG (NIPPON NYUKAZAI CO., LTD.) and Polyethylene Glycol Monomethyl Ether 550 (Tokyo Chemical Industry Co., Ltd.) and the like.

The content of the component (c) in the sealant for screwing members of the present invention is preferably 3 to 20 parts by mass, more preferably 5 to 15 parts by mass, and still more preferably 8 to 13 parts by mass when the amount of the sealant for screwing members excluding water as the dispersion medium is 84 to 86 parts by mass.

In the embodiment of the present invention, the addition amount of the component (c) based on 100 parts by mass of the solid content of the component (a) is preferably 54 to 79 parts by mass, more preferably 57 to 75 parts by mass, and still more preferably 60 to 73 parts by mass. When the addition amount of the component (c) based on 100 parts by mass of the solid content of the component (a) is less than 54 parts by mass, the addition amount is not sufficient to prevent the coating film from being biased, which may cause the coating film to be biased. Meanwhile, when the addition amount of the component (c) based on 100 parts by mass of the solid content of the component (a) is more than 79 parts by mass, an excessive change in viscosity, or the like may cause deterioration in sealing properties and deterioration in storage stability with time.

The sealant for screwing members of the present invention contains water as the dispersion medium, and the above-mentioned components (a), (b) and (c) as main constituent components. The sealant for screwing members may contain other components as necessary. For example, the sealant for screwing member contains a filler, a pH adjuster, a rust inhibitor, an antifoaming agent, a pigment, an adhesion-imparting agent, and a dispersant and the like in necessary amounts as long as the function of the present invention is not hindered, whereby the physical properties of the sealant for screwing member can be appropriately adjusted. When the filler is contained in the sealant for screwing members of the present invention, the component (a) can also function as a binder for the filler. The lower limit of the main constituent components (in terms of solid content) is preferably 12 parts by mass or more, more preferably 15 parts by mass or more, and still more preferably 20 parts by mass or more when the total amount of the sealant for screwing members excluding water as the dispersion medium (including water contained in raw materials to be charged) is 84 to 86 parts by mass. The upper limit of the amount is not limited, but it is preferably 60 parts by mass or less, more preferably 50 parts by mass or less, still more preferably 40 parts by mass or less, and yet still more preferably 30 parts by mass or less.

As the filler, for example, silica, talc, mica, diatomaceous earth, an acrylic resin powder, a polyethylene resin powder, a polytetrafluoroethylene resin powder, a nylon resin powder, a glass particulate powder, a metal oxide particulate powder, and microcapsules and the like can be used. It is preferable to use a flexible polyethylene resin powder and a fluorine resin powder from the viewpoint of the sealing properties, and it is more preferable to use a polytetrafluoroethylene resin powder from the viewpoint of heat resistance.

In the embodiment of the present invention, when a powdery filler is used, the average particle size (D50) of the powdery filler is preferably 0.1 to 200 μm, more preferably 0.5 to 150 μm, and still more preferably 1 to 80 μm. Here, a method for measuring the average particle size (D50) is based on a laser diffraction scattering method. In the embodiment of the present invention, it is preferable to use fillers having two or more average particle sizes in combination. Such an embodiment is likely to provide a closest packed structure when the sealant is applied to the screwed portion, to lead to a good appearance, which is preferable. In the embodiment of the present invention, when the fillers having two or more average particle diameters are used in combination, the relatively largest average particle diameter (D50) value based on the relatively smallest average particle diameter (D50) is preferably 1.5 to 400, more preferably 2 to 100, still more preferably 2 to 30, yet still more preferably to 20, further preferably 4 to 15, further more preferably 5 to 10, further still more preferably 6 to 9, and further yet still more preferably 7 to 8. Such an embodiment has a technical effect of being likely to provide the closest packed structure to lead to a good appearance, which is preferable.

In the embodiment of the present invention, the content of the filler in the sealant for screwing members is preferably 10 to 65 parts by mass, more preferably 20 to 60 parts by mass, and still more preferably 25 to 50 parts by mass when the amount of the sealant for screwing members excluding water as the dispersion medium is 84 to 86 parts by mass.

Examples of the pH adjuster include any alkaline aqueous solution. For example, ammonia water, lithium hydroxide, potassium hydroxide, sodium hydroxide, monomethylamine, dimethylamine, morpholine, N-methylmorpholine, N,N-dimethylethanolamine, N-(β-aminoethyl)ethanolamine, N-methylethanolamine, and N-methyldiethanolamine and the like are suitable.

In the embodiment of the present invention, the content of the pH adjuster in the sealant for screwing members is preferably 0.01 to 10 parts by mass, more preferably 0.5 to 8.0 parts by mass, and still more preferably 0.5 to 5.0 parts by mass when the amount of the sealant for screwing members excluding water as the dispersion medium is 84 to 86 parts by mass.

Suitable examples of the rust inhibitor include chromates (for example, zinc chromate, calcium chromate, strontium chromate, barium chromate, zinc potassium chromate, and tetrabasic zinc chromate and the like), phosphates (for example, zinc phosphate, zinc phosphorus silicate, zinc aluminum phosphate, zinc calcium phosphate, calcium phosphate, aluminum pyrophosphate, calcium pyrophosphate, aluminum dihydrogen triphosphate, aluminum metaphosphate, calcium metaphosphate, zinc phosphomolybdate, and aluminum phosphomolybdate and the like), nitrites (for example, sodium nitrite, calcium nitrite, strontium nitrite, barium nitrite, and ammonium nitrite and the like), phytates (for example, zinc phytate, sodium phytate, potassium phytate, and calcium phytate and the like), tannates (for example, sodium tannate and potassium tannate and the like), polyamine compounds (for example, N-(2-hydroxyethyl) ethylenediamine triacetic acid (HEDTA), ethylenediaminetetraacetic acid (EDTA), diethylenetriaminepentaacetic acid (DTPA), propylenediaminetetraacetic acid (PDTA), iminodiacetic acid, nitrilotriacetic acid (NTA), diethylenetriaminepentamethylenephosphonic acid (DTPMP), and alkali metal salts thereof); monoalkylamines and polyamines, intercalation compounds formed by intercalating quaternary ammonium ions and the like into a layered phosphate such as aluminum dihydrogen tripolyphosphate; and MIO, lead cyanamide, ammonium metavanadate, ammonium zircofluoride, zinc molybdate, aluminum molybdate, barium metaborate, and organic nitro compound zinc salts and the like.

In the embodiment of the present invention, the content of the rust inhibitor in the sealant for screwing members is preferably 0.01 to 15 parts by mass, more preferably 0.5 to 13 parts by mass, and still more preferably 0.5 to 10 parts by mass when the amount of the sealant for screwing members excluding water as the dispersion medium is 84 to 86 parts by mass.

Suitable examples of the antifoaming agent include a silicone-based antifoaming agent (silicone-based surfactant), a modified silicone-based antifoaming agent, an acetylene alcohol-based surfactant, a silica-based antifoaming agent, a wax, a polyether-modified polydimethylsiloxane, a paraffin-based oil, and a foam-breaking aliphatic derivative and the like.

In the embodiment of the present invention, the content of the antifoaming agent in the sealant for screwing members is preferably 0.1 to 10 parts by mass, more preferably 0.5 to 5.0 parts by mass, and still more preferably 1.0 to 3.0 parts by mass when the amount of the sealant for screwing members excluding water as the dispersion medium is 84 to 86 parts by mass.

As the pigment, an organic pigment and an inorganic pigment and the like are suitable. Suitable examples of the organic pigment include isoindolinone, isoindoline, azomethine, perylene, anthraquinone, dioxazine, and phthalocyanine and the like. Suitable examples of the inorganic pigment include carbon black, ultramarine blue, prussian blue, iron oxide red, titanium dioxide, and lithopone and the like.

In the embodiment of the present invention, the content of the antifoaming agent in the sealant for screwing members is preferably 0.01 to 8 parts by mass, more preferably 0.1 to 7 parts by mass, still more preferably 0.3 to 5 parts by mass, and yet still more preferably 1 to 4 parts by mass when the amount of the sealant for screwing members excluding water as the dispersion medium is 84 to 86 parts by mass.

[Method for Manufacturing Sealant for Screwing Members]

The sealant for screwing members of the present invention can be manufactured by stirring and mixing the above-described components. The order of addition is not particularly limited, but in order to uniformly disperse the nanofiberized aramid fibers, it is preferable that water as a dispersion medium, nanofiberized aramid fibers, a filler, and an antifoaming agent are first stirred, and another raw material is then added to the mixture. Examples of a stirring device include a homodisper manufactured by PRIMIX and a three-one motor manufactured by Shinto Kagaku Co., Ltd. and the like, but the stirring device is not particularly limited as long as it can uniformly disperse components. A stirring time is preferably 10 to 180 minutes, and more preferably 30 to 120 minutes, for uniform dispersion. A stirring speed is preferably 150 to 3000 rpm, and more preferably 200 to 2000 rpm, for uniform dispersion. As a stirring blade, a turbine blade, an inclined paddle blade, an inclined turbine blade, and a propeller blade are suitable. The time and the number of rotations and the like can be appropriately set.

[Screwing Member to which Sealant for Screwing Members is Applied]

The present invention provides a method for manufacturing a screwing member, which includes coating the screwing member with the sealant for screwing members.

The sealant for screwing members of the present invention has excellent adhesion with the screwing member. In particular, even if a coating film is formed by applying a sealant for screwing members to a screw surface, the peeling-off of the coating film from a screw interface is significantly suppressed by friction caused by tightening a screwing member to a female screw or a substrate or the like (suitably, the coating film is not peeled off). The fact that the peeling-off is significantly suppressed (suitably, the coating film is not peeled off) allows the continuous formation of a coating on the screwed portion. Therefore, for example, in a member which needs to prevent the leakage of a liquid or gas, the leakage of the liquid or gas from the screwed portion in the member can be prevented. Therefore, the screwing member to which the sealant for screwing members is applied is useful as a pre-coat type screw sealant.

[Screwing Member]

The present invention provides a screwing member coated with the sealant for screwing members.

In the embodiment of the present invention, examples of the screwing member include, but are not particularly limited to, screw joints such as a nipple, a socket, a tapered plug, and an elbow which have a screwed portion, and an inner periphery of a nut and the like in addition to the above-mentioned screw.

EXAMPLES

Hereinafter, a sealant for screwing members of the present invention will be more specifically described with reference to Examples and Comparative Examples. However, Examples and Comparative Examples facilitate the understanding of the present invention, and the present invention is by no means limited by examples thereof. Unless otherwise specified, "%" and "part" mean "% by mass" and "part by mass", respectively. In the following Examples, unless otherwise specified, the operation was performed under conditions of room temperature (25° C.)/relative humidity 40 to 50% RH.

Production of Sealant for Screwing Members

Each Component was appropriately stirred and mixed with a stirrer depending on compositions shown in Table 1 to prepare sealants for screwing members of Examples and Comparative Examples. More specifically, water as a dispersion medium, nanofiberized aramid fibers, a polytetrafluoroethylene powder, and a surfactant were first stirred in order to uniformly disperse the nanofiberized aramid fibers, and other raw materials were then added to the mixture.

Examples 1 to 5 and Comparative Examples 1 to 10

[Component (a)]
ACRONAL (registered trademark) YS-800ap (a self-cross-linking emulsion containing a styrene-(meth)acrylic acid ester copolymer, solid content: 47 wt %, manufactured by BASF Japan Ltd.)

[Component (a')]
Movinyl (registered trademark) 6969 (a non-self-cross-linking emulsion containing a (meth)acrylic acid ester copolymer or a (meth)acrylic acid ester homopolymer, solid content: 50 wt %, manufactured by Nippon Synthetic Chemical Industry Co., Ltd.)

[Component (b)]
Tiara KY-400S (nanofiberized aramid fibers, concentration: 20% (moisture: 80%), fiber diameter: 200 to 300 nm, length-length weighted average fiber length: 500 to 600 μm, aspect ratio: 1,500 to 3,000, manufactured by Du Pont-Toray Co., Ltd.)

[Component (b')]
Kevlar K29 (non-nanofiberized aramid fibers, concentration: 93% (moisture: 7%), fiber diameter: 12 μm, fiber length: 3.0 mm, aspect ratio: 250, manufactured by Du Pont-Toray Co., Ltd.)
Cellulose nanofiber CNF-500 (cellulose nanofiber, concentration: 5%, fiber diameter: 30 to 200 nm, fiber length: unmeasurable, aspect ratio (estimated): 100 to 500, manufactured by Mori Machinery Corporation).

[Component (c)]
Methyl polyglycol (containing a compound in which n in the formula 1 is 4 or more, in an amount of 70% by mass or more of the overall mixture, equilibrium reflux boiling point: 295° C., MPG (manufactured by NIPPON NYUKAZAI CO., LTD.))

[Component (c')]
Methyl diglycol (containing a compound in which n in the formula 1 is 2, in an amount of 99% by mass or more of the overall mixture, boiling point: 190° C., manufactured by NIPPON NYUKAZAI CO., LTD.)
Methyl triglycol (containing a compound in which n in the formula 1 is 3, in an amount of 99% by mass or more of the overall mixture; boiling point: 249° C., manufactured by NIPPON NYUKAZAI CO., LTD.)
Butyl triglycol (containing a compound in which n in the formula 1 is 3, in an amount of less than 50% by mass of the overall mixture; boiling point: 271.2° C., manufactured by NIPPON NYUKAZAI CO., LTD.).

[Other Addition Components]

Lubron (registered trademark) L-5F (average particle size D50: polytetrafluoroethylene powder of 5 μm, manufactured by Daikin Industries, Ltd.)

KT-300M (average particle size D50: polytetrafluoroethylene powder of 40 μm, manufactured by Kitamura Limited)

BYK-019 (silicone-based surfactant, manufactured by BYK-Chemi)

Olfin (registered trademark) SK-14 (acetylene alcohol-based surfactant, manufactured by Nissin Chemical Industry Co., Ltd.)

SN Thickener-651 (polyacrylic acid unneutralized product, manufactured by San Nopco Limited).

Numerical values shown in Table 1 indicate parts by mass to be added.

TABLE 11

|   | Raw material | Example 1 | Example 2 | Example 3 | Example 4 | Example 5 | Comparative Example 1 | Comparative Example 2 | Comparative Example 3 |
|---|---|---|---|---|---|---|---|---|---|
| (a) | ACRONAL YS-800ap | 32 | 32 | 32 | 32 | 32 | 32 | 32 | 32 |
| (a') | Movinyl 6969 | | | | | | | | |
| (b) | Tiara KY-400S | 0.25 | 0.25 | 0.25 | 0.64 | 1.00 | 0.25 | 0.25 | 0.25 |
| | Kevlar K29 | | | | | | | | |
| (b') | Cellulose nanofiber CNF-500 | | | | | | | | |
| (c) | MPG (methyl polyglycol) | 9 | 10 | 11 | 10 | 10 | 0.00 | 0.00 | 0.00 |
| | MDG (methyl diglycol) | | | | | | | | 10 |
| (c') | MTG (methyl triglycol) | | | | | | | | |
| | BTG (butyl triglycol) | | | | | | | | 10 | |
| | Lubron L-5F | 20 | 20 | 20 | 20 | 20 | 20 | 20 | 20 |
| | KT-300M | 20 | 20 | 20 | 20 | 20 | 20 | 20 | 20 |
| Others | BYK-019 | 1.0 | 1.0 | 1.0 | 1.0 | 1.0 | 1.0 | 1.0 | 1.0 |
| | Olfin SK-14 | 1.5 | 1.5 | 1.5 | 1.5 | 1.5 | 1.5 | 1.5 | 1.5 |
| | SN Thickener 651 | 0.8 | 0.8 | 0.8 | 0.8 | 0.8 | 0.8 | 0.8 | 0.8 |
| Total | | 84 | 85 | 86 | 86 | 86 | 75 | 85 | 85 |
| Addition amount of solid content of component (b) or (b') based on 100 parts by mass of solid content of component (a) | | 0.33 | 0.33 | 0.33 | 0.85 | 1.3 | 0.33 | 0.33 | 0.33 |
| Addition amount of solid content of component (c) or (c') based on 100 parts by mass of solid content of component (a) | | 60 | 66 | 73 | 66 | 66 | 0.00 | 66 | 66 |

|   | Raw material | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|
| (a) | ACRONAL YS-800ap | 32 | 32 | 0.00 | 32 | 32 | 0.00 | 32 |
| (a') | Movinyl 6969 | | | 30 | | | 30 | |
| (b) | Tiara KY-400S | 0.25 | 0.00 | 0.00 | 0.00 | 0.00 | 0.25 | 0.00 |
| | Kevlar K29 | | | | | 0.05 | | |
| (b') | Cellulose nanofiber CNF-500 | | | | 1.0 | | | |
| (c) | MPG (methyl polyglycol) | 0.00 | 0.00 | 0.00 | 10 | 10 | 10 | 10 |
| | MDG (methyl diglycol) | | | | | | | |
| (c') | MTG (methyl triglycol) | 10 | | | | | | |
| | BTG (butyl triglycol) | | | | | | | |

TABLE 11-continued

| | | | | | | | | |
|---|---|---|---|---|---|---|---|---|
| | Lubron L-5F | 20 | 20 | 20 | 20 | 20 | 20 | 20 |
| | KT-300M | 20 | 20 | 20 | 20 | 20 | 20 | 20 |
| Others | BYK-019 | 1.0 | 1.0 | 1.0 | 1.0 | 1.0 | 1.0 | 1.0 |
| | Olfin SK-14 | 1.5 | 1.5 | 1.5 | 1.5 | 1.5 | 1.5 | 1.5 |
| | SN Thickener 651 | 0.8 | 0.8 | 0.8 | 0.8 | 0.8 | 0.8 | 0.8 |
| Total | | 85 | 75 | 75 | 85 | 85 | 85 | 85 |
| Addition amount of solid content of component (b) or (b') based on 100 parts by mass of solid content of component (a) | | 0.33 | 0.00 | — | 0.33 | 0.33 | — | 0.00 |
| Addition amount of solid content of component (c) or (c') based on 100 parts by mass of solid content of component (a) | | 66 | 0.00 | — | 66 | 66 | — | 66 |

Production of Screwing Member Coated with Sealant for Screwing Members

A method for producing a screwing member coated with a sealant for screwing members by coating the sealant for screwing members shown in each of Examples and Comparative Examples will be described below.

Examples 1 to 5 and Comparative Examples 1 to 10

[Method for Producing Screwing Member Coated with Sealant for Screwing Members]

A bolt (a hexagon bolt having a bolt size M10 (diameter)× 1.5 (pitch)×20 mm (length)) which had been subjected to a zinc plating chromate treatment was prepared.

The viscosity of the sealant for screwing members prepared above was adjusted to 350 mPa·s with a dispersion medium (diluent) (water) to prepare a processing liquid. More specifically, each composition (each sealant for screwing members) was uniformly stirred with a stirrer for 10 minutes, and the viscosity of the composition was then measured according to a viscometric method defined in JIS K 7117-2: 1999 (BL viscometer, 60 rpm, rotor No. 2, 25° C.×55% RH). An appropriate amount of water was added as a diluent, and the operation of uniformly stirring the sealant for screwing members with a stirrer for 10 minutes to measure the viscosity was repeated until the viscosity of the sealant for screwing members was set to 350 mPa·s, thereby preparing a processing liquid.

While a hexagonal part of the bolt was held by hand or fixed with a magnet for dip coating, the bolt was lowered so as to be perpendicular to the liquid level of the processing liquid to apply (dip-apply) the processing liquid to 80 to 90% of a screwed portion. After a few seconds, the bolt was slowly removed from the liquid level, and the sealant adhering to a screw tip was then wiped with a waste cloth with the screw tip facing down. While the water as the diluent in the processing liquid applied to the screwed portion was not volatilized (within about 30 minutes), heat drying was performed with a hot air drier at 90° C. for 30 minutes with the screw tip facing down, to produce a screwing member (pre-coated bolt) coated with the sealant for screwing members.

<Method for Evaluating Properties of Sealant for Screwing Members>

[Appearance Evaluation Method]

The appearance evaluation was visually performed.

○: There are no factors which impair the appearance such as bias and cracks of a coating film.

x: There are factors which impair the appearance such as bias and cracks of the coating film.

[Storage Stability of Processing Liquid]

In samples (Examples and Comparative Examples) which were evaluated as "○" in the appearance evaluation, the processing liquid (sample adjusted to 350 mPa·s) was placed in a 300-ml polypropylene container and stored at 40° C. for one month. The storage stability was confirmed by evaluating the change in viscosity and the sealing properties after storage (tested by the following method).

○: The viscosity after storage was 350±100 mPa·s, and the sealing properties after storage were equivalent to the initial sealing properties.

x: The viscosity after storage was lower than 250 mPa·s or higher than 450 mPa·s, or the sealing properties after storage were lower than the initial sealing properties.

[Sealing Properties (Airtightness)]

Figure 1:
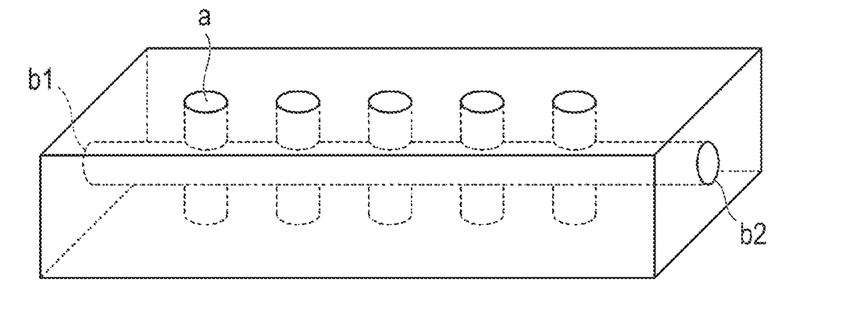
FIG. 1 is a view showing one embodiment of a seal test jig.

The sample was prepared, and then placed in a closed container. Thereafter, a pre-coated bolt was produced within one week, and the sealing properties were confirmed. Ten pre-coated bolts were assembled into bolt inserting holes of an aluminum seal test block shown in FIG. 1, and a gas sealing hole b1 was then assembled into a seal tester. Other gas sealing hole b2 was closed with a taper plug wrapped with a seal tape to prevent the leakage of a gas sealed from the seal tester. The pre-coated bolt was assembled into the aluminum seal test block at a tightening torque of 30 N·m. The aluminum seal test block was placed in a container filled with water, and pressure was supplied by nitrogen gas supplied from the seal tester, to evaluate the gas sealing properties of the aluminum seal test block. The pressure of the nitrogen gas added to the seal test block was initially set to 0.5 MPa, and held for 2 minutes to confirm the presence or absence of the leakage of the nitrogen gas. The pressure was increased in stages of 0.5 MPa every 2 minutes. Pressure at the time when the leakage occurred from a place where the bolt was tightened was visually confirmed. The final pressure was set to 2.0 MPa, and the maximum pressure at which no leakage occurred was recorded. A pressure gauge was provided in the seal tester, and the pressure was increased while the pressure gauge was read. The aluminum seal test block is placed in the container filled with water to perform the seal test in order to make it easier to confirm the occurrence of the leakage of the nitrogen gas. The sealing properties of 1.5 MPa or more exhibited in the test of the sealing properties suggest that the results are preferable.

Table 2 shows the evaluation results of the properties.

Comparative Example 9 shows the results when the addition amount of the solid content of the component (b) based on 100 parts by mass of the solid content of the component (a') is 0.33 parts by mass, and the component (c) is added so that the addition amount of the component (c) based on 100 parts by mass of the solid content of the component (a') is 66 parts by mass.

TABLE 2

| Evaluation of properties | Example 1 | Example 2 | Example 3 | Example 4 | Example 5 | Comparative Example 1 | Comparative Example 2 | Comparative Example 3 |
|---|---|---|---|---|---|---|---|---|
| (1) Appearance | ○ | ○ | ○ | ○ | ○ | x | x | x |
| (2) Storage stability | ○ | ○ | ○ | ○ | ○ | — | — | — |
| (3) Sealing properties | 2.0 | 2.0 | 2.0 | 2.0 | 2.0 | 2.0 | 0.5 | 1.0 |

| Evaluation of properties | Comparative Example 4 | Comparative Example 5 | Comparative Example 6 | Comparative Example 1 | Comparative Example 8 | Comparative Example 9 | Comparative Example 10 |
|---|---|---|---|---|---|---|---|
| (1) Appearance | ○ | x | x | x | x | x | x |
| (2) Storage stability | x | — | — | — | — | — | — |
| (3) Sealing properties | 1.0 | 0.5 | 0.5 | 0.5 | 1.5 | 0.0 | 1.0 |

From the results in Table 2, by using the component (b) (nanofiberized aramid fiber) and the component (c) (a film-forming aid containing a compound represented by the formula 1, wherein n is 4 or more, and an equilibrium reflux boiling point is 280° C. or higher), an excellent appearance, storage stability, and sealing properties could be provided.

In Examples 1 to 3 and Comparative Example 1, the addition amount of the component (c) was varied when the addition amount of the solid content of the component (b) based on 100 parts by mass of the solid content of the component (a) was 0.33 parts by mass.

In Examples 2, 4, and 5, and Comparative Example 10, the addition amount of the component (b) was varied when the addition amount of the component (c) based on 100 parts by mass of the solid content of the component (a) was 66 parts by mass.

Comparative Examples 2 to 4 show the results when the addition amount of the solid content of the component (b) based on 100 parts by mass of the solid content of the component (a) is 0.33 parts by mass, and the component (c') is added so that the amount of the component (c') based on 100 parts by mass of the solid content of the component (a) is 66 parts by mass.

From these results, it was found that a component which substantially contains a compound having no structure of the formula 1 or only a compound of n=3 or less has poor properties. In Comparative Example 4 using the compound of n=3, it was found that the coating film tends to be unbiased, but the sealing properties and the storage stability with time tend to be poor.

Comparative Examples 7 and 8 show the results when the addition amount of the component (c) based on 100 parts by mass of the solid content of the component (a) is 66 parts by mass, and the component (b') is added so that the amount of the component (b') based on 100 parts by mass of the solid content of the component (a) is 0.33 parts by mass. From these results, it was found that the properties are not good when nanofiberized cellulose or a non-nanofiberized aramid fiber is used.

From this, it was found that when the non-self-cross-linking emulsion containing a (meth)acrylic acid ester copolymer or a (meth)acrylic acid ester homopolymer is used, the properties are not good.

Comparative Example 5 shows the results when the component (a) is used, and the components (b) and (c) are not added. Comparative Example 6 shows the results when the component (a') is used, and the components (b) and (c) are not added. In both the cases, it was found that the properties are not good if the components (b) and (c) are not used.

INDUSTRIAL APPLICABILITY

A sealant for screwing members of the present invention can prevent a coating film from being biased when the sealant is processed on a screwing member, and volatile components are volatilized by hot air drying, and provide an excellent appearance as a pre-coated bolt.

REFERENCE SIGNS LIST

A bolt inserting hole
b-1, b-2 gas sealing hole

This application is based on Japanese Patent Application No. 2017-234206 filed on Dec. 6, 2017, and the disclosure content is incorporated by reference in its entirety.

The invention claimed is:

1. A sealant for screwing members comprising:
   (a) a self-cross-linking aqueous emulsion;
   (b) a nanofiberized aramid fiber substance; and
   (c) a film-forming aid containing a mixture,
   wherein the mixture contains a compound represented by the following formula 1:

$$CH_3O-(CH_2CH_2O)_n-H \qquad \text{(Formula 1)},$$

n is 4 or more, and
   an equilibrium reflux boiling point of the overall mixture is 280° C. or higher.

2. The sealant for screwing members according to claim 1, wherein the mixture contains the compound in an amount of 50% by mass or more.

3. The sealant for screwing members according to claim 1, wherein the component (a) is a styrene-(meth)acrylic acid ester copolymer emulsion.

4. The sealant for screwing members according to claim 1, wherein an aspect ratio of the component (b) is 1,000 to 3,000.

5. The sealant for screwing members according to claim 1, wherein an addition amount of a solid content of the component (b) based on 100 parts by mass of a solid content of the component (a) is 0.1 to 3.0 parts by mass.

6. The sealant for screwing members according to claim 1, wherein an addition amount of the component (c) based on 100 parts by mass of a solid content of the component (a) is 54 to 79 parts by mass.

7. A method for manufacturing a screwing member comprising coating the screwing member with the sealant for screwing members according to claim 1.

8. A screwing member coated with the sealant for screwing members according to claim 1.

* * * * *